Feb. 23, 1960 A. R. DENZ ET AL 2,926,314

ADJUSTABLE EQUALIZER

Filed July 23, 1956 3 Sheets-Sheet 2

Feb. 23, 1960 A. R. DENZ ET AL 2,926,314

ADJUSTABLE EQUALIZER

Filed July 23, 1956 3 Sheets-Sheet 3

2,926,314

ADJUSTABLE EQUALIZER

Arthur R. Denz, Oak Park, and Edward B. Du Bois, Park Forest, Ill., assignors to International Telephone and Telegraph Corporation, New York, N.Y., a corporation of Maryland Application July 23, 1956, Serial No. 599,583

3 Claims. (Cl. 333—18)

This invention relates to an adjustable equalizer. Its principal object is to provide an equalizer which includes a simple arrangement for automatically or manually varying the slope of the attenuation-versus-frequency characteristic. Further objects are to provide an equalizer for which the design is simple, the values of the components are easily computed, and the insertion loss is low and relatively stable at the reference frequency.

In multichannel telephone carrier systems, it is common practice to group several frequency-separated channels in a frequency band, with a separate such group for each direction. The telephone line used as the transmission medium causes attenuation which partially depends upon the frequency, signals at the higher frequencies being attenuated more than those at the lower frequencies. The resulting slope in the attenuation-versus-frequency characteristic not only causes the respective channels to be received at different levels, which may be compensated for by regulators in the individual channel equipments; but the frequencies within each channel are attenuated differently, causing distortion. The slope of the attenuation characteristic varies considerably according to weather conditions, especially when an open-wire line is used. The slope may be compensated for in the group receiving equipment by providing an equalizer, which is a filter having an attenuation characteristic with a slope opposite to that of the line, for the concerned frequency band.

Equalizers are known with arrangements for manually or automatically adjusting their characteristic to meet varying line conditions, the automatic regulators including means for comparing the levels of two pilot or carrier signals at selected frequencies. Heretofore, such equalizers have comprised complicated circuit arrangements requiring difficult and time-consuming computation from special formulae to determine the values of the components. In addition, the insertion loss was often substantial at all frequencies in the band, and the range of control was small.

According to the invention, a standard filter with adjustable resistors added to control the attenuation is used as an equalizer. Such a filter is usually used to pass the signal band with low loss while blocking other frequencies, but here the design is such that the signal band lies in the ranges between the cut-off frequency and a frequency of high attentuation. The filter is easily designed to have the maximum slope required over the specified frequency range, and the proper characteristic impedance, by using standard graphs and simple formulae. The slope of the attentuation characteristic may be adjusted from the maximum to flat by varying the resistance of a single unit.

In the preferred form of the invention, the equalizer comprises a high-pass m-derived filter, having two series arms which are parallel resonant, and an inductive shunt arm, with a cut-off frequency approximately equal to the highest frequency of the band. The adjustment arrangement includes a manually adjustable resistor shunted across one series arm, and an automatically adjustable resistance device shunted across another series arm and controlled by an arrangement for comparing the levels of two pilot signals.

The foregoing and other objects and features of this invention and the manner of attaining them will become more apparent and the invention itself will be best understood, by reference to the following description of an embodiment of the invention taken in conjunction with the accompanying drawings comprising Figs. 1 to 6, wherein.

It has been chosen to disclose the invention as applied to a multi-channel telephone transmission system, with transmission over an open two-wire line.

Figures 1, 5, 6:
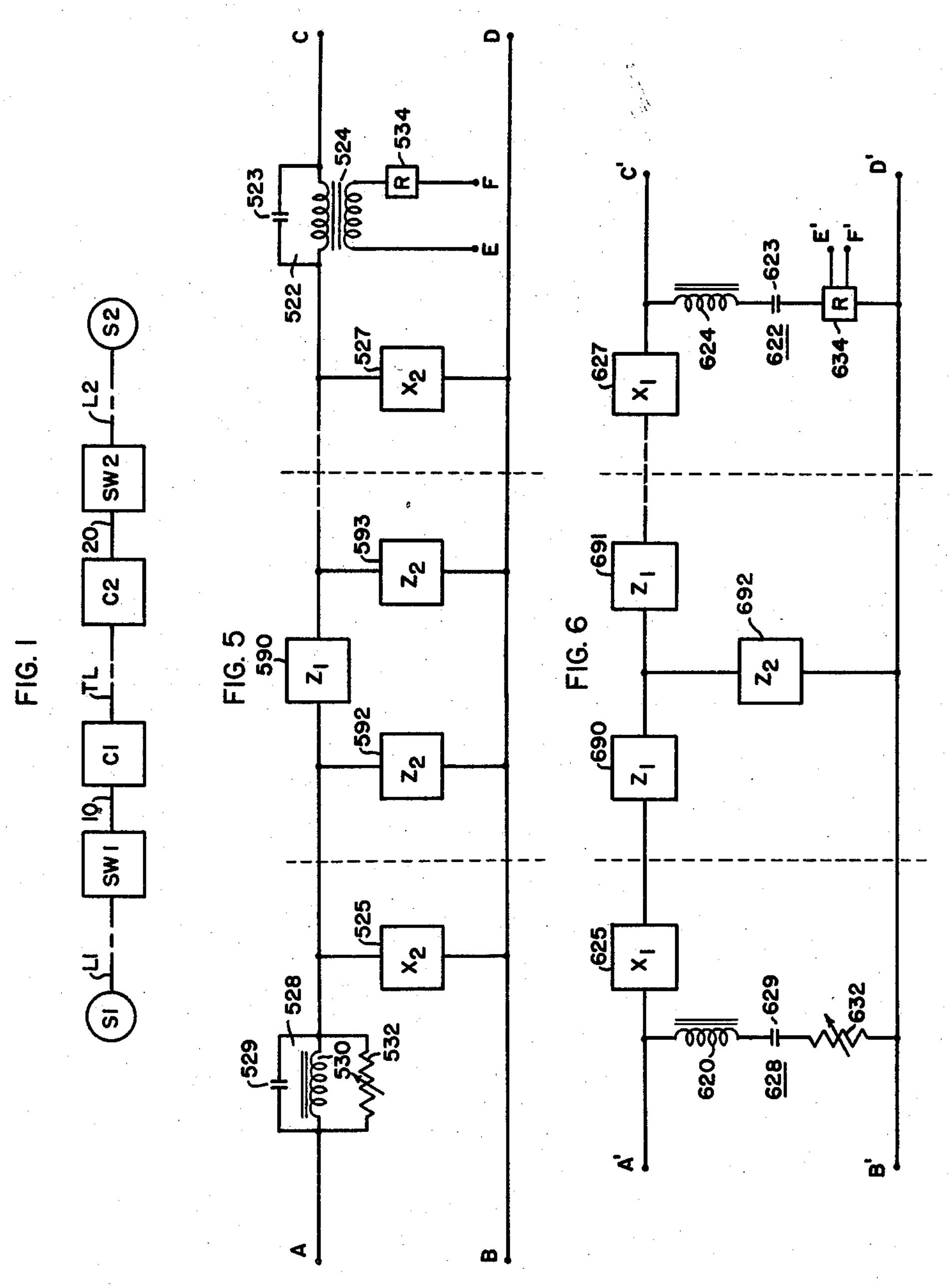
Fig. 1 shows a block diagram of a telephone system including carrier equipment.
Figs. 5 and 6 show filters which may be used as equalizers.

Referring to Fig. 1, a switchboard SW1 at a first exchange has subscriber lines such as line L1 to station S1, and connections through conductor group 10 to carrier terminal equipment C1. The second exchange includes a similar switchboard SW2, lines such as L2 to station S2 and carrier terminal equipment C2 connected to the switchboard by conductor group 20. An open two-wire transmission line TL extends between the carrier equipments C1 and C2.

Figure 2:
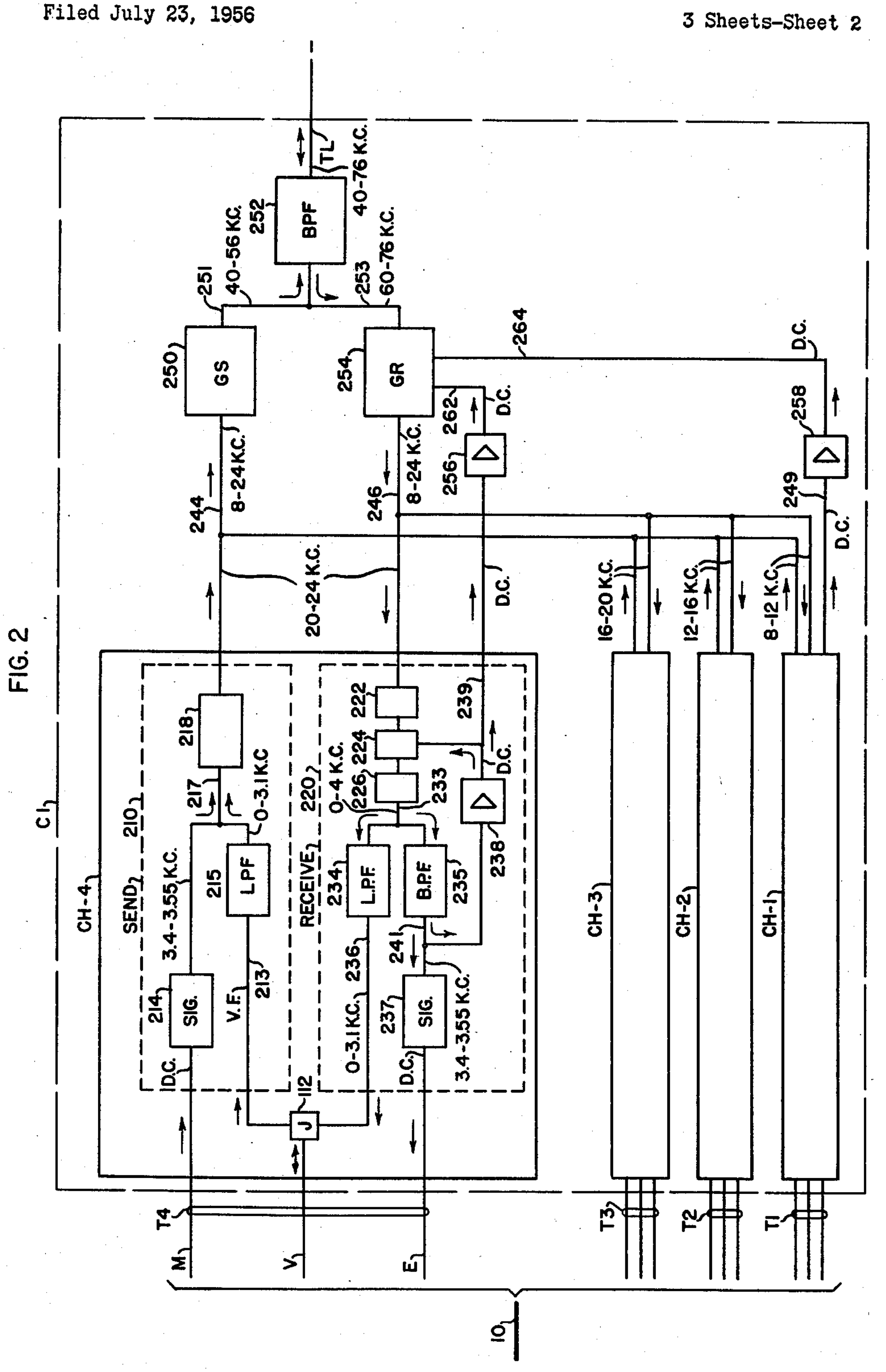
Fig. 2 shows a block diagram of a carrier terminal of Fig. 1.

Fig. 2 shows a block diagram of the carrier terminal equipment C1. Conductor group 10 includes four trunks T1 to T4, each comprising the direct current signalling leads M and E and a voice-signal pair V. The trunks are connected to the respective channel equipments CH–1 to CH–4. As shown for channel 4, each channel equipment includes send equipment 210, receive equipment 220, and a balanced junction 112. The junction 112 includes a hybrid transformer and a balancing network for coupling the conjugate outgoing line 213 and incoming line 236 to the two-way line V. The voice signals on line 213 are coupled through low-pass filter 215 to line 217. The D.C. signals from line M modulate an oscillator in the signal equipment 214, which produces a pilot signal applied to line 217. This pilot signal is shifted between 3400 cycles and 3550 cycles, while the voice signal output from filter 215 is limited to a high of 3100 cycles. The voice and pilot signals are combined on line 217 and passed through a modulator and band pass filter 218 to produce signals in the 20–24 kilocycle channel at the output to line 244. The outgoing signals from channel equipments CH–1 to CH–4 in separate frequency channels as indicated are supplied in multiple to line 244 giving a four channel band of 8 to 24 kilocycles. These signals then pass through amplifiers, modulators and band pass filters in the group send equipment 250, where they are converted to the 40 to 56 kilocycle band, then passing over line 251 and through a group line filter 252 to the transmission line TL.

Incoming signals on line TL, in the 60 to 76 kilocycle band, are coupled through the group line filter 252, over line 253, through the group receive equipment 254, where are are converted to signals in the 8 to 24 kilocycle band, thence to line 246, connected in multiple to the incoming lines of the channel equipments CH–1 to CH–4. The band is divided into respective channels, as indicated, by hand-pass filters such as filter 222 in the channel equipment CH–4.

From the filter 222 the signals pass through an automatic gain regulator 224, and the amplifying and demodulating equipment 226, to line 233. The pilot and voice signals are then separated by the filters 234 and 235, the voice signals, which are under 3100 cycles, passing through the low-pass filter 234, while the pilot signals, which are at 3400 or 3550 cycles, pass through the band-pass filter 235. The voice signals on line 234 are then coupled through junction 112 to line V. The frequency discriminator and signalling equipment 237 converts the pilot signal to a D.C. signal on line E.

The pilot signal on line 241 is also connected to a control amplifier and detector in equipment 238, supplying a D.C. signal on line 239 according to the amplitude of the pilot signal on line 241, to control the regulator 224. Equipment 238 also includes an alarm circuit for indicating when the pilot signal falls below a given level. Each channel equipment includes a regulator similarly controlled. The controlled signals from channels 1 and 4 on lines 239 and 249 respectively, are further amplified by respective group-control amplifiers 256 and 258 for regulation in the group-receiving equipment 254.

Figures 3, 4:
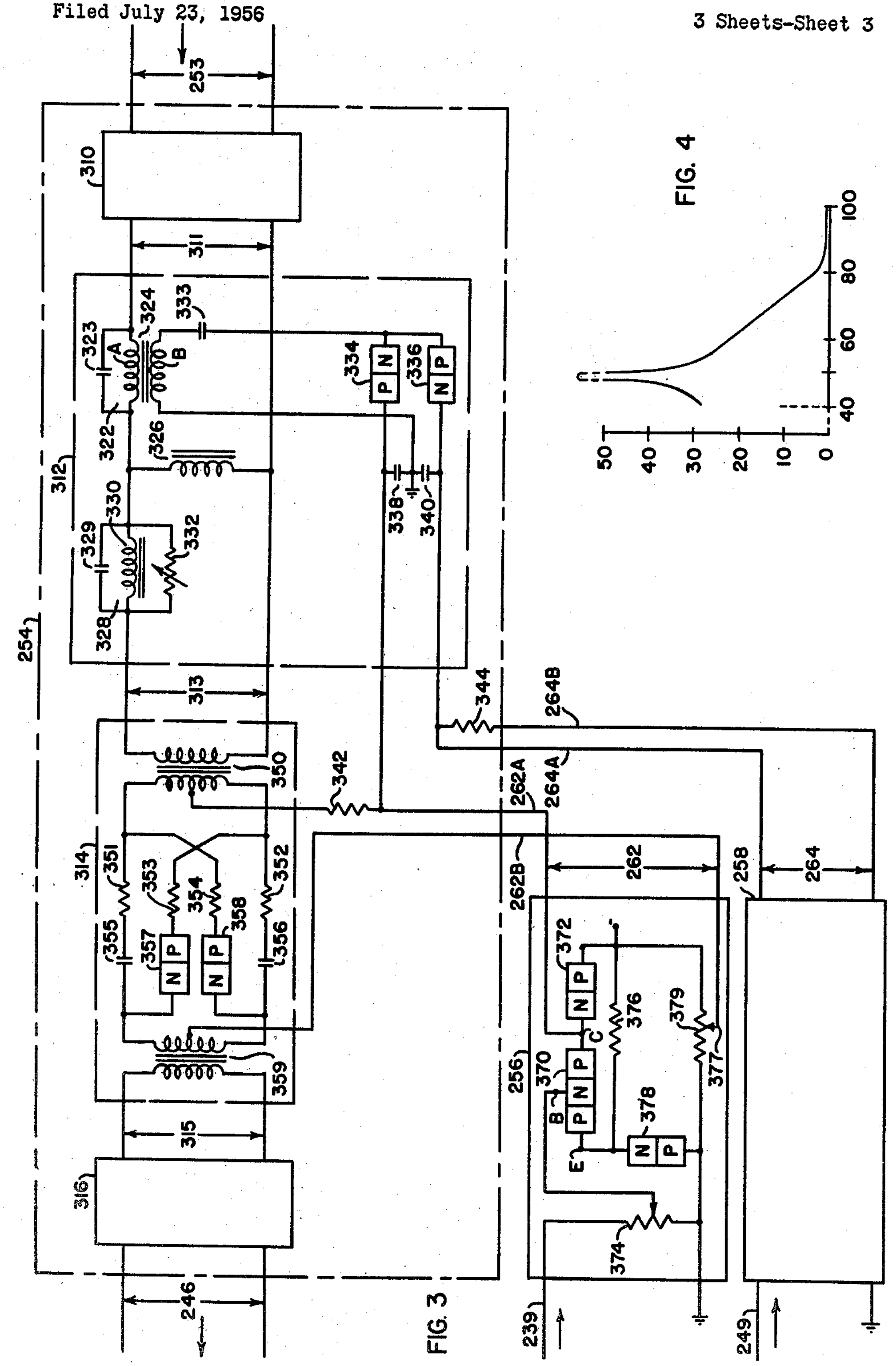
Fig. 3 shows the details of a portion of the equipment of the carrier terminal.
Fig. 4 shows the attenuation characteristic of the equalizer used in the system.

Referring now to Fig. 3, the group receiving equipment 254 and the regulation control amplifiers 256 and 258 are shown, partly in circuit detail.

Signals on line 253 from the group line filter pass through band-pass filter 310, a slope equalizer 312, a flat regulator 314, and the group demodulating and amplifying equipment 316, and thence over line 246 to the receiving band-pass filters of the four channels in parallel.

The flat regulator 314 comprises a lattice network of resistors 351, 352, 353, and 354, blocking condensers 355 and 356, and diodes 357 and 358 in a balanced line section between transformer 350 and transformer 359, for introducing equal attenuation over the entire band according to the level of pilot signal 4. The D.C. output on line 262 from amplifier 256 is supplied to regulator 314 by connecting wire 262A through resistor 342 to the center tap of transformer 350 and wire 262B to the center tap of transformer 359. The D.C. flow through the diodes 357 and 358 controls their A.C. impedance, and thereby controls the signal loss in regulator 314.

The amplifier 256 comprises a PNP junction transistor 370. The base terminal is connected to the sliding tap of a resistor 374 which is connected from the input line 239 to ground. A regulated one-volt negative potential is obtained at the emitter terminal by connecting it to the junction of a resistor 376 and a diode 378, which are connected in series between the negative terminal of a D.C. power supply and ground.

A bridge circuit is used in the output, with a junction diode connected between the collector terminal and the negative supply terminal, a resistor 379 between the negative supply terminal and ground, and output to line 262 taken between the collector terminal and sliding tap 377 of resistor 379. Diode 372 is chosen to have a temperature characteristic similar to the collector diode of transistor 370, so that with zero input current, the output current may be adjusted to be zero over a wide temperature range.

The D.C. control signal obtained from the pilot signal of channel 4 and flowing over line 239 normally produces a negative potential at the base terminal which exceeds the one-volt potential at the emitter terminal, causing input and output current to flow.

The amplifier components may be a 1,000-ohm resistor 374, a 10,000-ohm resistor 376, a 20,000-ohm resistor 379, a type 6003 diode 378, a type 1N91 diode 372, and a type 2N44 transistor 370, with a 48-volt D.C. supply.

Amplifier 258 is similar to amplifier 256, and amplifies the D.C. control signal from channel 1 on line 249 to supply output current to line 264.

The equalizer 312 comprises an *m*-derived high-pass filter in the form of a T section, having two series arms 322 and 328 and one shunt arm 326.

An *m*-derived filter comprises a number of four-terminal sections connected together, designed to pass certain frequencies with negligible loss, while attenuating other frequencies as required. The sections may be of T, pi, or L form; and be high, low, or band-pass.

Fig. 5 shows a filter with one or more pi intermediate sections comprising a series arm 590 between two shunt arms 592 and 593, a left-end L section of series arm 528 and shunt arm 525, and a right-end L section of series arm 522 and shunt arm 527, series arms being connected to the end terminals. The series arms 528, 590 and 522 are parallel-tuned circuits. The shunt arms 525, 592, 593, and 527 are inductors for a high-pass, or capacitors for a low-pass filter.

Fig. 6 shows a filter with one or more T intermediate sections comprising a shunt arm 692 between series arms 690 and 691, a left-end L section of shunt arm 628 and series arm 625, and a right-end L section of shunt arm 622 and series arm 627, shunt arms being connected to the end terminals. The shunt arms 628, 692, and 622 are series-tuned circuits. The series arms 625, 690, 691, and 627 are capacitors for a high-pass, or inductors for a low-pass filter.

The component values for any section are determined by the characteristic impedance, R; the cut-off frequency, $f_c$; and a peak frequency, $f_p$. A factor $m$ is defined as the square root of the quantity one minus the square of the ratio of the peak and cut-off frequencies, the ratio being less than one. The design equations are well known and may be found in several texts on filters. Adjacent shunt or series arms of different sections are combined to obtain the final values.

For example, for a high-pass filter according to Fig. 5, the shunt arms each have an inductance which is $2L_2$, with $L_2$ equal to $R/(2w_cm)$. The symbol $w_c$ is used for the factor $2f_c$ times pi. A series arm such as 590 comprises a capacitance $C_1$ in parallel with an inductance $L_1$, with C equal to the reciprocal of $(2w_cmR)$, and $L_1$ equal to $(4mR)/(2w_c)(1-m^2)$. The end sections 528 and 522 each have an inductance of $\frac{1}{2}L_1$ and a capacitance of $2C_1$.

The equalizer 312 in Fig. 3 is a combination of the two end sections of Fig. 5, the shunt arms 525 and 527 being combined into a single inductor 326 having a value of $L_2$. Using a characteristic impedance R of 600 ohms, a cut-off frequency $f_c$ of 80 kc., and a factor $m$ of 0.8; the values obtained are, capacitors 329 and 323, 0.00414 microfarads; inductors 330 and winding A of 324, 2.63 millihenries; inductor 326, 0.745 millihenries; and a peak frequency at 48 kc.

The signals passing through the equalizer 312 are in the band from 60 to 76 kc., which is in the range between the cut-off and peak frequencies; whereas the usual purpose of a filter of this type is to pass, with low loss, signals above the cut-off frequency. Here, the signals are attenuated according to a reasonably linear portion of the characteristic plotted with attenuation in db versus frequency in kc.

According to the invention, an adjustable resistance device is shunted across each of the series arms 322 and 328, to provide a simple arrangement for varying the slope of the attenuation characteristic. A manually adjustable resistor 332 is connected across arm 328; and an arrangement with automatically adjustable A.C. resistance, comprising diodes 334 and 336, is coupled through condensers 333, 338, and 340 to a secondary winding B of inductor 324.

The slope is maximum, with the greatest difference between the highest and lowest frequencies of the signal band, when the resistance is maximum across both arms 322 and 328. The slope becomes less as the resistance across either series arm is decreased, and is substantially flat with negligible loss at all frequencies in the band when both series arms are shunted by zero resistance.

Fig. 4 shows a graph of the attenuation in decibels versus frequency in kilocycles for equalizer 312, with the total resistance loss in all the components being that which gives a Q of 30. This is about the maximum slope obtainable for the circuit values chosen. The loss is about 20 db at 60 kc., and about 7 db at 76 kc., a difference of about 13 db. Each of the series arms provides a range of adjustment of the slope equal to half of the maximum slope, for any setting of the other arm. It is possible to choose component values to obtain a greater slope, up to about 20 db difference between 60 and 76 kc., with satisfactory linearity.

The equalizer 312 is used to compensate for linear attenuation-versus-frequency characteristics of the transmission line TL, wherein high frequencies are attenuated more than low frequencies; therefore the equalizer should be adjusted to have a characteristic with a slope equal and opposite to that of the line, with maximum attenuation for the low frequencies.

The manual control is set to a value which will permit automatic control over the range of variation encountered on line TL.

The automatic control operates to maintain the pilot signals 1 and 4 at nearly the same level after passing through the equalizer 312. The overall variation in signal level on line 313 is reduced by the group regulator 314 and the channel regulators such as 224 for channel 4 (Fig. 2). Therefore pilot signal 4 has a small variation at line 241, but it is amplified and detected by the channel control amplifier 238, and the D.C. signal is further amplified by group control amplifier 256. The output of amplifier 256 is used primarily to control regulator 314, as explained above, but it is also used along with the output from similar amplifier 258 for the control signal of channel 1 to control the equalizer 312.

Wire 262A of line 262 is connected to the positive terminal of diode 334; and wire 264A of line 264 is connected to the negative terminal of diode 336. The other terminals of the diodes are connected together so that they are series aiding for D.C. signals from the outputs of amplifiers 256 and 258. A resistor 344 connected across line 264 is equal to resistor 342 in series with the D.C. path through regulator 314, which may be 4700 ohms. The condensers 338 and 340 provide filtering at the outputs of amplifiers 256 and 258, as well as coupling diodes 334 and 336 to winding B of inductor 324. The diodes 334 and 336 are in parallel opposition for A.C. signals from winding B of inductor 324, to provide a more linear A.C. resistance than is obtainable with a single diode.

To explain the operation, it may be noted that in the signal band on line 311 at the output of band-pass filter 310, pilot signal 1 is at a higher level than pilot signal 4. Initially with no current flowing in the diodes 334 and 336 the slope of attenuation in the equalizer 312 is maximum, causing pilot signal 1 to be attenuated to a level lower than pilot signal 4. Therefore control signal 4 has a higher level than control signal 1, the output on wire 262A is more positive to ground than the output on wire 264A, and current flows through the diodes 334 and 336 in the forward direction. This current flow causes the slope of equalization to become flatter, reducing the difference in level of the pilot signals and the current flow through the diodes, until stability is reached with a small difference in level between the pilot signals. This difference is the error signal required to maintain the current flow through the diodes which produces the correct resistance in arm 322.

In a system requiring an equalizer with maximum attenuation at high frequencies, a low-pass filter according to Fig. 5 or Fig. 6 may be used.

In Fig. 5, with a high or low-pass filter, the slope may be varied by resistance in the series arms, such as manually adjusted resistor 532, or resistance device 534 automatically adjusted by a D.C. control signal at terminals EF.

If a high or low-pass filter with series resonant shunt arms and simple reactance series arms, as shown in Fig. 6, is used, the adjustable resistance devices may be connected in series in the shunt arms. For example, a manually adjustable resistor 632 may be connected in arm 628; and a resistance device 634 may be connected in arm 622, automatically adjusted by a D.C. signal applied to terminals E'F'.

While we have described above the principles of our invention in connection with specific apparatus, it is to be clearly understood that this description is made only by way of example and not as a limitation to the scope of our invention.

We claim:

1. An adjustable equalizer of signal attenuation according to frequency within a signal band of frequencies which comprises an intermediate portion of a selected frequency range including all frequencies lying on one side of a selected cutoff frequency, the equalizer consisting of series and shunt reactive arms interconnected between input and output terminals traversed by said signal band to comprise a filter of the class consisting of high-pass and low-pass filters, said filter establishing said cutoff frequency and establishing a non-attenuated range and an attenuated range of frequencies lying on respective sides thereof, at least one said arm being resonant at a peak frequency within said attenuated range to provide an attenuation which rises with frequency departure from said cutoff frequency to an attenuation peak at said peak frequency, said selected range comprising said attenuated range, with said signal band comprising frequencies lying between said cutoff and peak frequencies, whereby signals therein are attenuated according to their departure from said cutoff frequency, and an adjustable resistance device included in said resonant arm for controlling the attenuation of the equalizer at said attenuation peak, whereby the attenuation-versus-freqency characteristic of the equalizer is correspondingly controlled for signals throughout the signal band.

2. An adjustable equalizer for signals within a signal band of frequencies, comprising a filter having a pair of input terminals, a pair of output terminals, a first group of impedance arms connected in series between one input terminal and one output terminal, a second group of impedance arms connected in shunt between respective ends of the said series arms and a connection between the other input terminal and the other output terminal, the filter having a cut-off frequency determined by said arms, with a first range of frequencies to one side of the cut-off frequency in which any signals are passed with negligible loss, and a second range of frequencies to the other side of the cut-off frequency in which signals are attenuated, the said signal band comprising an intermediate portion of the second range, at least one arm in one said group being resonant at a peak frequency in the second range to produce attenuation which rises throughout the signal band to a peak lying outside the signal band, the arms in the other said group consisting of reactance elements of one type, an adjustable resistance device included in said resonant arm for controlling the attenuation-versus-frequency characteristic of the filter for signals throughout the signal band, a transmission line, a remote source of signals within the said signal band and means coupling it to the said input terminals by way of the transmission line, means for deriving a control current having a value which depends upon the strength relation at the said output terminals between two continuous signals from the signal source of respective frequencies within the said signal band, and means for controlling the alternating-current resistance value of the said adjustable resistance device according to the value of the control current.

3. In a combination according to claim 2, a second resonant arm in the same said group as the first said resonant arm, and a manually-adjustable resistor included in the second resonant arm for controlling the attenuation-versus-frequency characteristic of the filter for signals within the said signal band.

References Cited in the file of this patent

UNITED STATES PATENTS

| | | |
|---|---|---|
| 2,096,027 | Bode | Oct. 19, 1937 |
| 2,143,407 | Chesnut | Jan. 10, 1939 |
| 2,153,743 | Darlington | Apr. 11, 1939 |
| 2,733,413 | Tongue | Jan. 31, 1956 |
| 2,737,629 | Beerbaum | Mar. 6, 1956 |
| 2,738,465 | Schramm | Mar. 13, 1956 |
| 2,782,378 | Johannesson | Feb. 19, 1957 |